May 20, 1930.    C. CHERRY ET AL    1,759,001
HEAT DISTRIBUTOR
Filed June 19, 1929    2 Sheets-Sheet 1

INVENTOR
Chester Cherry.
G. A. Froggatt
BY
Albert B. Dietrich
ATTORNEY

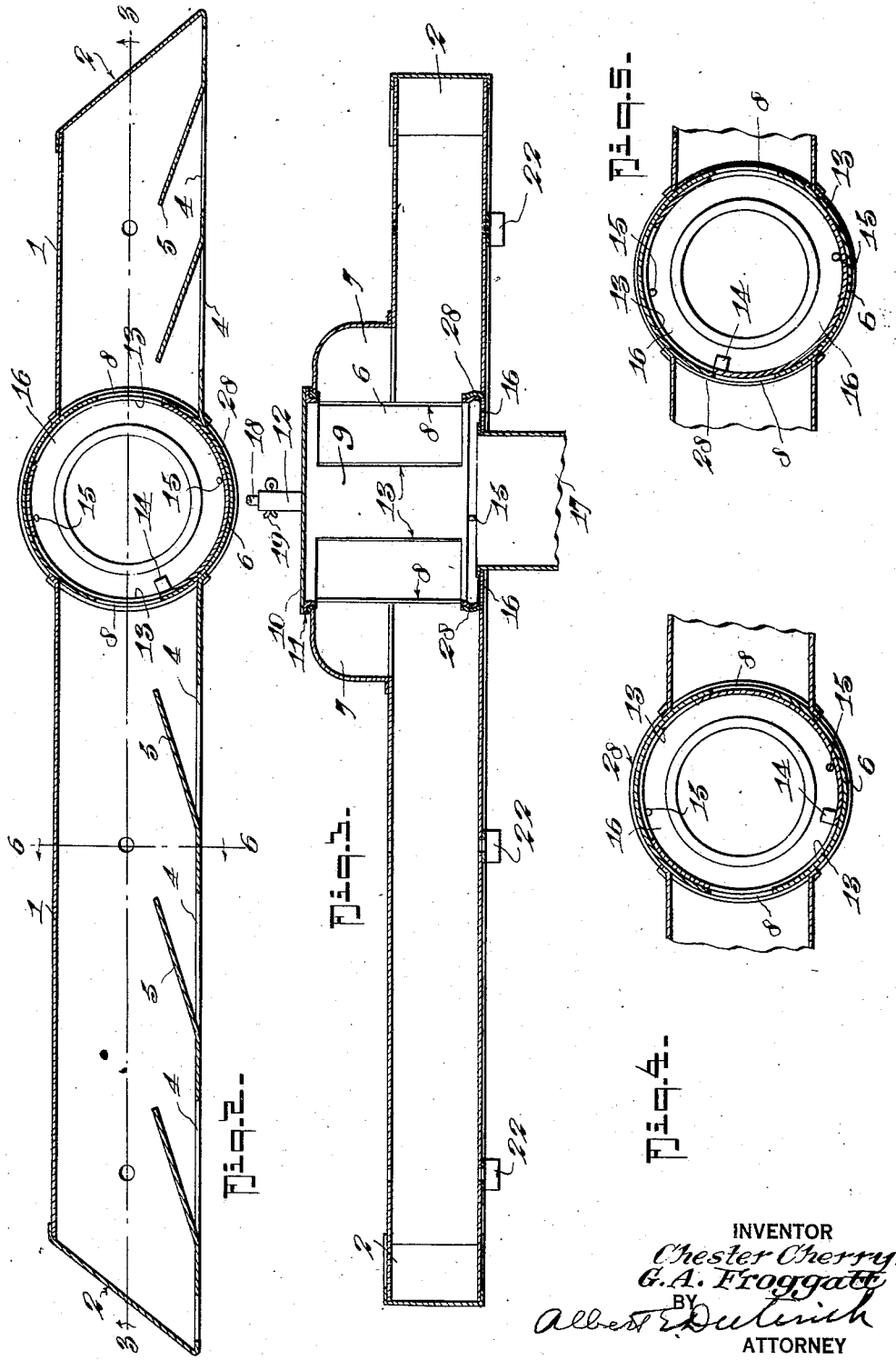

Patented May 20, 1930

1,759,001

UNITED STATES PATENT OFFICE

CHESTER CHERRY, OF CANAL WINCHESTER, AND GEORGE A. FROGGATT, OF COLUMBUS, OHIO

HEAT DISTRIBUTOR

Application filed June 19, 1929. Serial No. 372,166.

Our invention relates to the art of automotive vehicles and particularly it has for its object to provide a device by the use of which the hot air from a heater may be liberated adjacent the juncture of the sloping or inclined floor board with the vertical dash board of the vehicle and directed downwardly and spread over the face of the floor board to either or both sides at will, thereby to warm the feet of the driver or the passenger, or both, when occupying the front seat of the car.

Further, it is an object of the invention to provide a heat distributor having a control valve which is operable by a lever device located on the instrument panel of the car within convenient reach of the driver.

Further, it is an object to provide means for evenly distributing the heat from the hot air duct of the heater and in such manner that it will be liberated close to the sloping floor board and spread to either or both sides or over the whole width of the car as desired so that the hot air will keep moving toward the rear of the car, part of it along the floor, and part of it gradually rising to the top of the car to give a gentle warmth to the car.

Further, it is an object of the invention to provide a heat distributor embodying the advantageous features before referred to and which will be inexpensive to manufacture, will be neat in appearance, and will not take up needed room in the car.

Other objects will in part be obvious and in part be pointed out hereinafter.

To the attainment of the aforesaid objects and ends, our invention consists in the novel features of construction and in the combination, connection and arrangement of parts, hereiafter more fully described, and then pointed out in the appended claims.

In the drawings:

Figure 2 is an enlarged horizontal section of the same, the valve being positioned to open fully both sides of the distributor.

Figure 3 is a vertical section on the line 3—3 of Figure 2.

Figure 4 is a detail horizontal section showing the valve open to the left side only.

Figure 5 is a detail horizontal section showing the valve open to the right side only.

Figure 1:
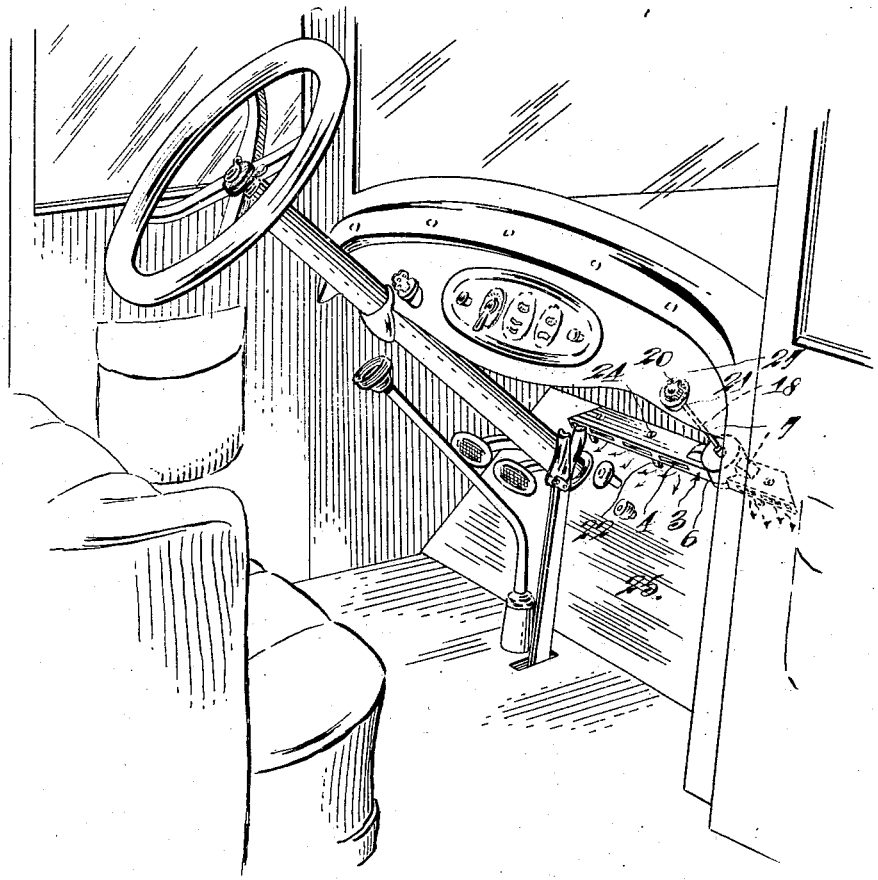
Figure 1 is a perspective view of a portion of an automobile with the invention applied.
Figure 6:
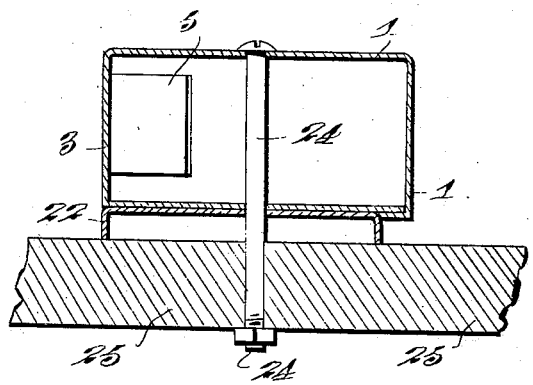
Figure 6 is a detail cross section on the line 6—6 of Figure 2.

In the drawings in which like numerals designate like parts in all of the figures, 1 represents the hollow elongated body of the distributor, the ends of which are beveled as at 2 to act as deflectors for the end openings 4 in the front edge wall 3 of the body 1. There are two sets of openings 4 in the front wall 3 separated by a valve casing 6 of cylindrical form which is open at the top, enlargements 7 being provided to conduct the air from the valve casing toward the ends of the body 1.

Certain of the openings 4 (those between the end openings and the valve casing) are provided with deflectors 5 which serve to assist in spreading the hot air discharged through the openings over the face of the inclined floor board 25 when the valve is open.

The valve casing 6 is provided with ports 8, one of which leads toward one end of the elongated body and the other toward the other end of the same. A rotary cylinder valve 9 is provided to work in the valve casing 6, one end of the valve 9 being closed as at 10, and flanged as at 11 to act as a cover for the open end of the valve casing 6.

The valve 9 is provided with a socket 12 to receive the operating rod 18, the rod being held in the socket by a cotter pin 19 and being projected through an opening in the instrument board 27 of the vehicle, a lever 20 being provided on the rod by which it may be turned to turn the valve.

The valve 9 is provided with two ports 13 so designed and positioned with respect to one another that by turning the valve one port 13 may be brought into register with a port 8 of the valve casing, or the other port 13 may be brought into register with the other port 8 of the valve casing so that the hot air will be passed to both ends of the elongated body 1 at the same time, or when the valve is in another position one of the ports 8 is closed off while the other remains open, and when the valve is in a third position both ports 8 will be closed off, see Figures 2, 4 and 5.

14 designates a stop on the valve 9 and 15 a stop on the bottom 16 of the valve casing 6. These stops are so positioned with respect to one another and to the ports of the valve that when the stops are in engagement upon turning the valve to its extreme position in one direction or the other, both ports 8 will be closed.

A suitable dial 21 may be provided on the instrument board for cooperation with the lever 20 to indicate the position of the ports of the valve.

In order to secure the elongated body to the inclined floor board 25 attaching screws 24 pass through apertures in the elongated body, there being suitable feet 22 provided on the under side of the elongated body for the purpose of spacing it from the floor board a distance sufficient to permit air circulation beneath the elongated body.

The valve casing 6 is closed at the bottom save for a neck 17 which is adapted to couple to the hot air duct of the heater provided on the automobile. These heaters usually consist of a sheet metal hood over the exhaust pipe into which air passes and from which it is delivered through an opening in the floor board, or in the vertical dash board, of the car to the interior of the body.

In our present invention we make no claim to the heater per se as the construction of the heater may be any type suitable for the purpose and such heaters are well known.

In order to secure the valve within the valve casing we provide the valve casing with interlocking grooves or beads 28 as shown. By forcing the valve into the valve casing these beads will spring into one another due to the resiliency of the valve and hold the parts in their assembled position with sufficient friction for the purpose.

From the foregoing it will be seen that by turning the lever 20 which is within convenient reach of the operator, he can cause the hot air of the heater to pass to either side of the elongated body from which it issues in the form of a spread fan and in a plane approximately parallel to the inclined floor board and in a downward direction. Thus the heat is distributed in such way that all danger of burning the occupant of the vehicle by concentration of the heat at one place is avoided and a more uniform heating of the car is attained than is possible with the old types of heaters now in common use.

The capacity of the distributor can be increased or diminished according to the requirements of the car or heater. The distributor being installed close to the dash is out of the way of the passengers' feet in the front seat and almost out of sight; once installed it need not be taken off as the valve completely closes the heater against passage of hot air.

An important feature of the distributor, as hereinbefore pointed out, is the discharge of the heat through the ventilators down close to the sloping floor boards, from the dash, thereby distributing the heat on either side or over the whole width of the car as desired; the hot air keeps flowing toward the rear of the car, part of it along the floor and part of it gradually rising toward the top of the car to give a gentle warmth within the car.

From the foregoing description, taken in connection with the accompanying drawings, is is thought that the complete construction, the manner of use and advantages of our invention will be clear to those skilled in the art to which it appertains.

What we claim is:

1. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, and means by which said valve may be turned.

2. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, and means by which said valve may be turned, said elongated body being flat, means to secure said body on the inclined floor board of a motor vehicle adjacent the vertical dash board thereof, said ventilator openings serving to discharge the heated air downwardly over the surface of said inclined floor board.

3. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, means by which said valve may be turned, said elongated body being flat, means to secure said body on the inclined floor board of a motor vehicle adjacent the vertical dash board thereof, said ventilator openings serving to discharge the heated air downwardly over the surface of said inclined floor board, and inwardly directed baffles located in said elongated body and extending from an edge of some of said openings whereby to spread out the discharged hot air in the form of an open fan.

4. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, means by which said valve may be turned, said elongated body being flat, means to secure said body on the inclined floor board of a motor vehicle adjacent the vertical dash board thereof, said ventilator openings serving to discharge the heated air downwardly over the surface of said inclined floor board, and inwardly directed baffles located in said elongated body and extending from an edge of some of said openings whereby to spread out the discharged hot air in the form of an open fan, the ends of said elongated body being beveled backwardly to act as baffles for the end openings of the front wall of said elongated body.

5. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, means by which said valve may be turned, said elongated body being flat, means to secure said body on the inclined floor board of a motor vehicle adjacent the vertical dash board thereof, said ventilator openings serving to discharge the heated air downwardly over the surface of said inclined floor board, inwardly directed baffles located in said elongated body and extending from an edge of some of said openings whereby to spread out the discharged hot air in the form of an open fan, the ends of said elongated body being beveled backwardly to act as baffles for the end openings of the front wall of said elongated body, and means to space said elongated body from said floor board to which it is attached a distance sufficient to permit air circulation beneath said elongated body.

6. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, means by which said valve may be turned, said means by which said valve may be turned comprising a rod extending from the valve through the instrument board of the motor vehicle, and an operating lever on said rod adjacent said instrument board.

7. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, and means by which said valve may be turned, said valve comprising a rotary cylinder closed at its outer end, said valve casing being open at its outer end to receive said cylinder.

8. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, and means by which said valve may be turned, said valve comprising a rotary cylinder closed at its outer end, said valve casing being open at its outer end to receive said cylinder, said valve and said valve casing having interlocking beads to retain said valve and casing assembled.

9. In heat distributors, a hollow elongated body having a front wall with ventilator openings and a valve casing intermediate the ends of said body, said valve casing having two ports, one for passing hot air toward one end of said elongated body and the other for passing hot air toward the other end of said elongated body, said valve casing having a neck for coupling to the duct of an air heater, a valve in said valve casing having ports for each of said valve casing ports and arranged to open one or both of said valve casing ports at a time, or to close both said ports at a time accordingly as said valve is in one position or another, and means by which said valve may be turned, said valve comprising a rotary cylinder closed at its outer end, said valve casing being open at its outer end to receive said cylinder, said valve and said valve casing having interlocking beads to retain said valve and casing assembled, stops on said valve and on said casing so related to one another and to said valve and to said valve ports that when said valve is turned in either direction until said stops are engaged said ports will be fully closed.

10. In combination with a motor vehicle having an inclined floor board, a vertical dash board adjacent the higher end of said floor board, and an instrument board elevated from said floor board and having an air heater with a hot air duct; a heat distributor comprising a flat hollow elongated body adapted to be secured flatwise on said inclined floor board adjacent its higher edge, said elongated body having two sets of ventilator openings in its front edge face and having a cylindrical valve casing intermediate said sets of openings, said valve casing having a port to effect communication with one end of said elongated body and having a second port to effect communication with the other end of said elongated body, said elongated body having means to deflect the air discharged therefrom in the form of a spread fan over the surface of said inclined floor board, said valve casing being open at its top and closed at its bottom save for a neck for attachment to said hot air duct, a cylindrical valve open at its lower end and closed at its upper end and fitted into said valve casing, means to retain said valve and valve casing assembled, said valve having ports to control the passage of hot air from said duct through said valve casing ports toward the ends of said elongated body, and means to turn said valve for purposes described.

CHESTER CHERRY.
GEORGE A. FROGGATT.